(12) United States Patent
Aoyama (10) Patent No.: US 8,960,644 B2
(45) Date of Patent: Feb. 24, 2015

(54) VALVE SEAT STRUCTURE OF FLUID CONTROL VALVE

(75) Inventor: Tatsuhito Aoyama, Kasugai (JP)

(73) Assignee: CKD Corporation, Komaki-Shi (JP)

( * ) Notice: Subject to any disclaimer, the term of this patent is extended or adjusted under 35 U.S.C. 154(b) by 159 days.

(21) Appl. No.: 13/272,705

(22) Filed: Oct. 13, 2011

(65) Prior Publication Data

US 2012/0097881 A1  Apr. 26, 2012

(30) Foreign Application Priority Data

Oct. 25, 2010  (JP) ................................. 2010-238305

(51) Int. Cl.
  F16K 7/12    (2006.01)
  F16K 41/12   (2006.01)
  F16K 1/42    (2006.01)

(52) U.S. Cl.
  CPC ...................................... *F16K 1/425* (2013.01)
  USPC .......................................... 251/331; 251/333

(58) Field of Classification Search
  CPC ............. F16K 1/425; F16K 7/14; F16K 7/16; F16K 27/0236; F16K 41/12
  USPC .................... 251/331, 332, 362, 333
  See application file for complete search history.

(56) References Cited

U.S. PATENT DOCUMENTS

| | | | | |
|---|---|---|---|---|
| 2,621,011 A | * | 12/1952 | Smith | ........................... 251/121 |
| 4,474,208 A | * | 10/1984 | Looney | ..................... 137/516.29 |
| 4,741,510 A | * | 5/1988 | Baumann | ...................... 251/205 |
| 5,131,627 A | * | 7/1992 | Kolenc | ........................... 251/331 |
| 5,295,660 A | * | 3/1994 | Honma | ......................... 251/297 |
| 5,326,078 A | * | 7/1994 | Kimura | ......................... 251/331 |
| 6,786,471 B2 | * | 9/2004 | Nakata et al. | ................. 251/331 |
| 6,997,440 B2 | * | 2/2006 | Tutt et al. | ..................... 251/331 |
| 7,175,157 B2 | * | 2/2007 | Tanikawa et al. | ............. 251/331 |
| 2004/0094740 A1 | * | 5/2004 | Itoi | ................ 251/331 |
| 2006/0118752 A1 | * | 6/2006 | Tin-Kai et al. | ................ 251/331 |
| 2007/0187634 A1 | * | 8/2007 | Sneh | ......................... 251/30.01 |

(Continued)

FOREIGN PATENT DOCUMENTS

| | | | | |
|---|---|---|---|---|
| EP | 1731808 A1 | * | 12/2006 | ................ F16K 7/16 |
| EP | 1921358 A1 | * | 5/2008 | ................ F16J 3/02 |

(Continued)

OTHER PUBLICATIONS

Sep. 11, 2012 Japanese Office Action issued in Japanese Patent Application No. 2010-238305 (with translation).

(Continued)

*Primary Examiner* — John K Fristoe, Jr.
*Assistant Examiner* — David Colon Morales
(74) *Attorney, Agent, or Firm* — Oliff PLC (57) ABSTRACT

In a valve seat structure of a fluid control valve comprising a valve element, a body formed with an inlet port and an outlet port, and a valve seat member provided in the body, the fluid control valve being configured to bring the valve element into or out of contact with the valve seat member to control the flow of a fluid, the valve seat member is formed in a ring shape and includes a valve seat portion with which the valve element will come into our out of contact. Assuming that a thickness of the valve seat portion in a radial direction of the valve seat member is a first thickness t1 (0<t1), a second thickness t2 corresponding to a height of the valve seat member in a direction along an axis of the fluid control valve is determined in a range of 0.5 t1≤t2≤1.5 t1.

4 Claims, 9 Drawing Sheets

(56) References Cited

U.S. PATENT DOCUMENTS

| | | | |
|---|---|---|---|
| 2008/0173834 A1* | 7/2008 | Aoyama et al. | 251/89 |
| 2008/0210312 A1* | 9/2008 | Glime | 137/375 |
| 2008/0224081 A1* | 9/2008 | Miyazaki et al. | 251/331 |
| 2008/0290312 A1 | 11/2008 | Hirose et al. | |
| 2010/0090151 A1* | 4/2010 | Tanikawa et al. | 251/331 |

FOREIGN PATENT DOCUMENTS

| | | |
|---|---|---|
| JP | U-4-48470 | 4/1992 |
| JP | A-9-108769 | 4/1997 |
| JP | A-2002-147623 | 5/2002 |
| JP | A-2003-322263 | 11/2003 |
| JP | A-2007-64333 | 3/2007 |
| JP | A-2008-151270 | 7/2008 |
| JP | A-2008-286361 | 11/2008 |

OTHER PUBLICATIONS

Apr. 30, 2014 Office Action issued in Chinese Patent Application No. 201110342796.5 (with translation).

* cited by examiner

|  | Just after valve opening | | After a lapse of predetermined time from valve opening | |
|---|---|---|---|---|
|  | Stroke St (mm) | Cv | Stroke St (mm) | Cv |
| Example 1 | 0.9 | 0.7 | 0.7 | 0.5 |
| Comparative Example | 0.9 | 0.7 | 0.5 | 0.3 |

VALVE SEAT STRUCTURE OF FLUID CONTROL VALVE

CROSS-REFERENCE TO RELATED APPLICATIONS

This application is based upon and claims the benefit of priority from the prior Japanese Patent Application No. 2010-238305 filed on Oct. 25, 2010, the entire contents of which are incorporated herein by reference.

TECHNICAL FIELD

The present invention relates to a valve seat structure of a fluid control valve for controlling the flow of a fluid and more particularly to a valve seat structure of a diaphragm valve for controlling the flow of a fluid such as high-temperature gas (hot gas) in for example a semiconductor manufacturing device and others by bringing a diaphragm valve element into or out of contact with a valve seat.

BACKGROUND ART

In a semiconductor manufacturing process, a liquid crystal panel manufacturing process, and others, when a hot gas, such as $H_2$ gas and Ar gas, heated to about 200° C. is to be supplied to a semiconductor manufacturing device and others or shut off, a metal diaphragm valve as disclosed for example in Patent Documents 1 and 2 is used as a fluid control valve for controlling the flow of the hot gas.

Figure 6:
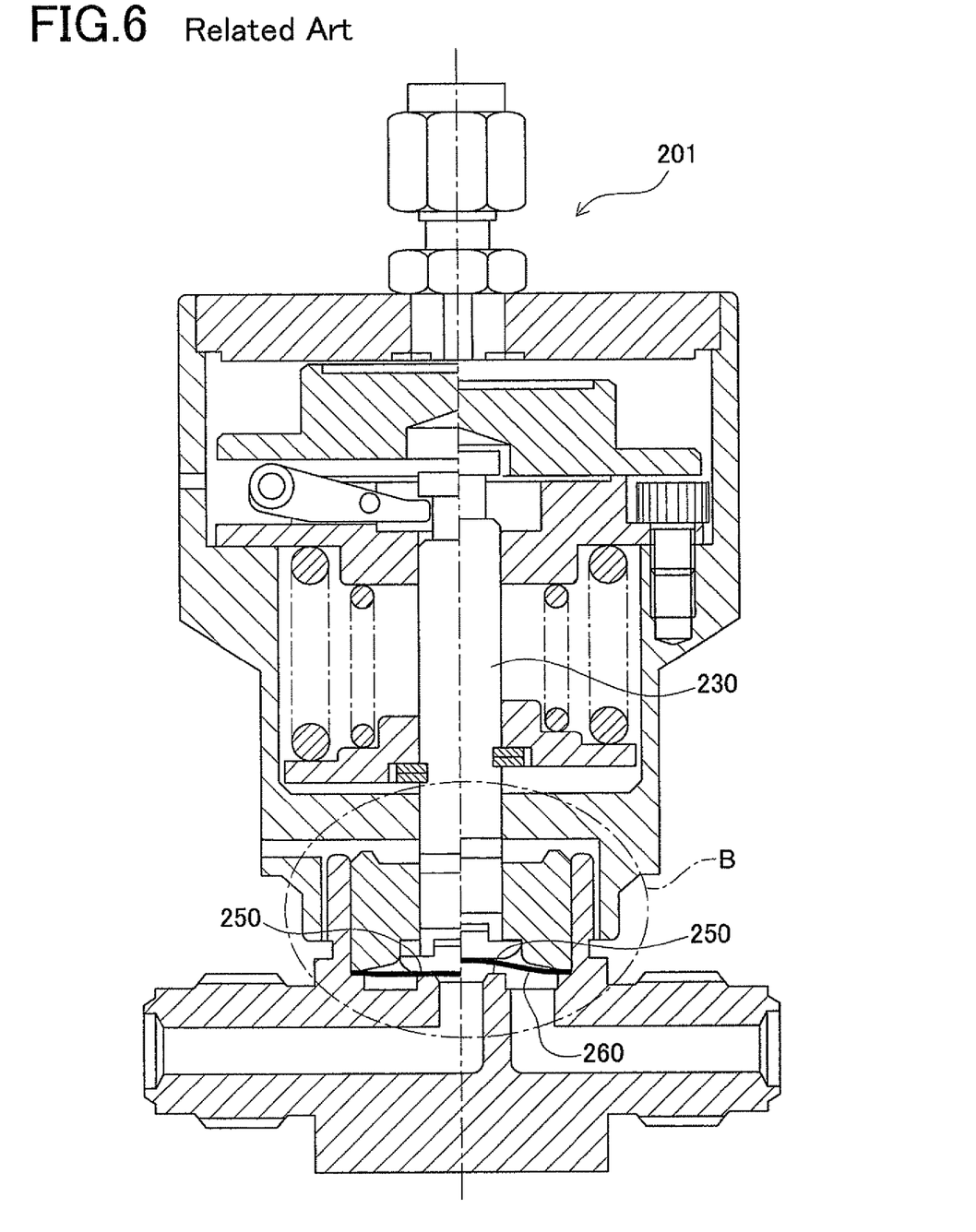
FIG. 6 is a view to explain a metal diaphragm valve disclosed in Patent Document 1.
Figure 7:
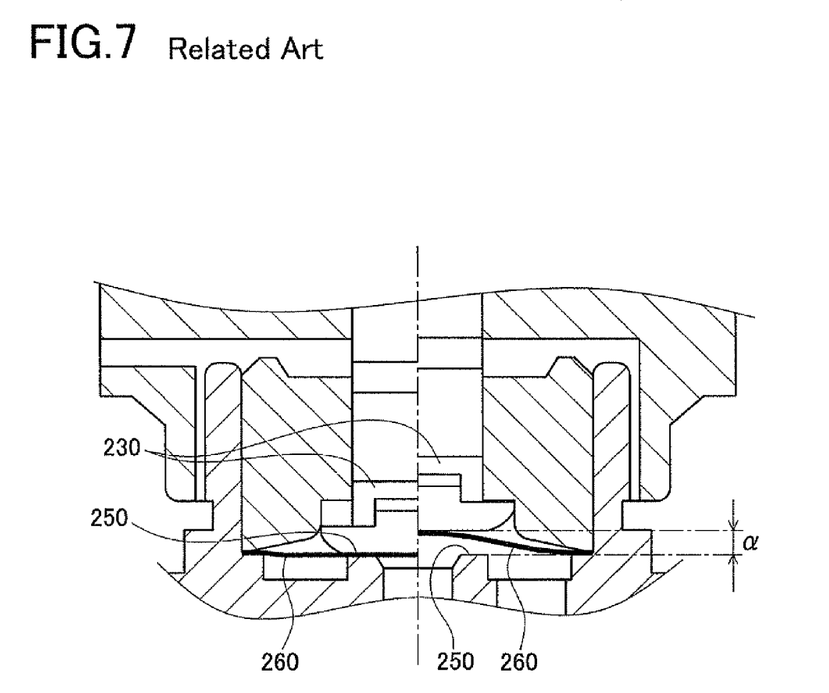
FIG. 7 is an enlarged view of a part B in FIG. 6.

FIGS. 6 and 7 are views to explain a metal diaphragm valve of Patent Document 1. Patent Document 1 discloses, as shown in FIGS. 6 and 7, a metal diaphragm valve 201 including a metal diaphragm 260 made with a Vickers hardness of 500 Hv or more by an age-hardening heat treatment. The diaphragm 260 is configured to contact with or separate from a valve seat 250 when pressured or released by a valve rod 230. In this metal diaphragm valve 201, when the pressure of the valve rod 230 is released, the metal diaphragm 260 elastically returns to its original shape.

In Patent Document 1, the metal diaphragm 260 is hardened to a Vickers hardness of 500 Hv or more. Accordingly, even in an environment that the metal diaphragm valve 201 is heated to a high temperature, it is possible to prevent a decrease in reactive force from the valve seat 250 to the diaphragm 260 at the time of valve closing and thermal expansion of the diaphragm 260 during valve opening. Even though Patent Document 1 does not disclose any shapes, any materials, any structures, etc. of the valve seat 250, it discloses that the diaphragm 260 made with hardness can keep a gap α between the diaphragm 260 and the valve seat 250 constant during control of the flow of hot gas.

Figure 8:
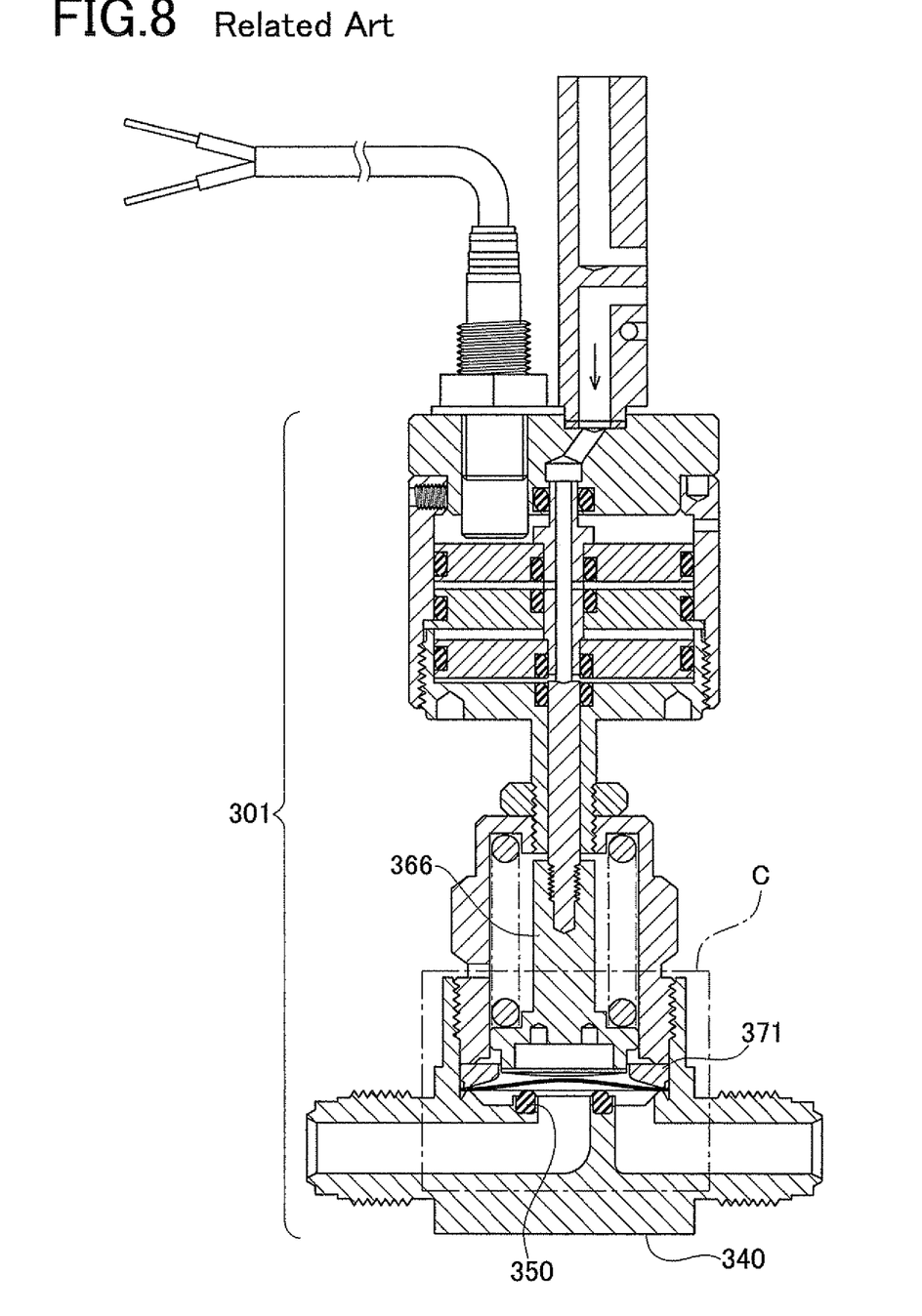
FIG. 8 is a view to explain a metal diaphragm valve disclosed in Patent Document 2.
Figure 9:
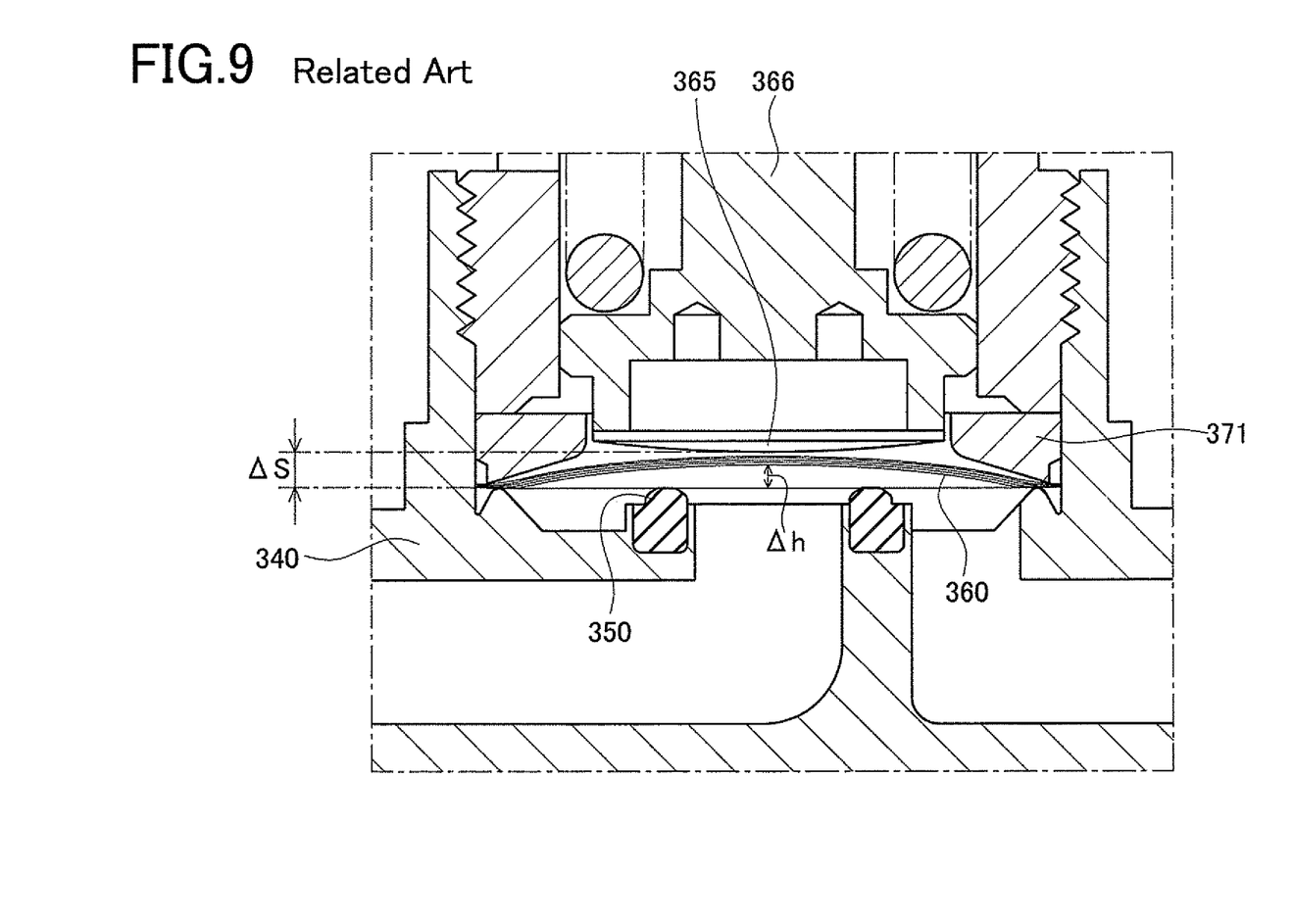
FIG. 9 is an enlarged view of a part C in FIG. 8.

FIGS. 8 and 9 are views to explain a metal diaphragm valve of Patent Document 2. Patent Document 2 shows a metal diaphragm valve 301 including a circular metal diaphragm 360 configured to contact with or separate from a valve seat 350 when the diaphragm 360 is pressed by or released from a stem 366 through a diaphragm holding member 365 as shown in FIGS. 8 and 9. The metal diaphragm 360 is a metal thin sheet made of stainless thin sheets and cobalt alloy thin sheets in a lamination configuration and formed into a reversed dish-like shape having a central portion protruding upward. The valve seat 350 is made of synthetic resin such as PFA and fixed in a valve attachment groove of a body 340 by crimping or caulking.

Patent Document 2 discloses, as shown in FIG. 9, that a gap ΔS between the diaphragm holding member 365 and the valve seat 350 is set to a height corresponding to about 55% to 70% of a maximum protruding height Δh of the central portion of the metal diaphragm 360 from the valve seat 350. Thus, the Cv value of the metal diaphragm valve 301 can be 0.55 to 0.8.

Figure 10:
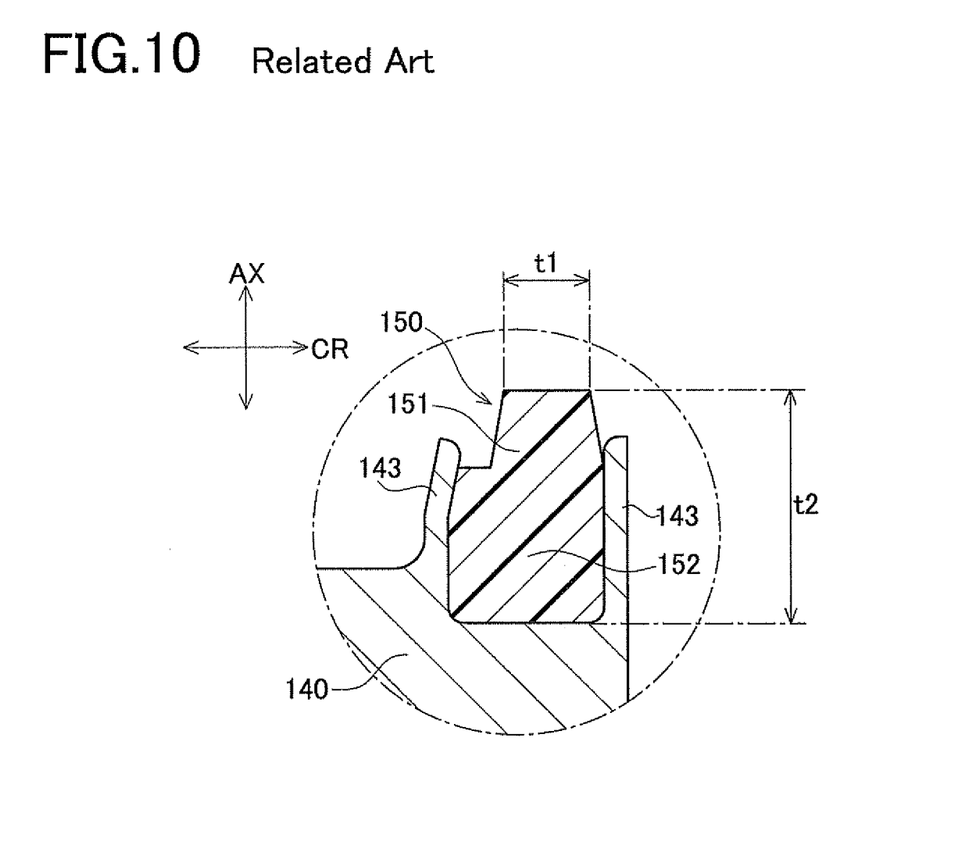
FIG. 10 is an explanatory view showing a valve seat structure of a metal diaphragm valve in Comparative example.

Although no related art is cited here, there is also a metal diaphragm valve in which a ring-shaped valve seat member made of synthetic resin such as PFA is fixed in a valve attachment groove of a body by crimping or caulking in a similar manner to Patent Document 2. FIG. 10 shows the shape of this valve seat member and is an enlarged view corresponding to a part A in FIG. 1 mentioned later.

In this metal diaphragm valve, as shown in FIG. 10, assuming that the thickness of a valve seat portion 151, which a valve element will contact with and separate from, in a radial direction CR of a valve seat member 150 is a first thickness t1, the valve seat member 150 has a second thickness t2 in its height direction AX larger about 2.7 times the first thickness t1. In this metal diaphragm valve, when a valve closed state is established, the valve element (not shown) deeply presses against the valve seat member 150 and reliably comes into close contact with the valve seat member 150. Thus, a sealing performance between the valve element and the valve seat member 150 can be enhanced.

RELATED ART DOCUMENTS

Patent Documents

Patent Document 1: JP 2008-151270A
Patent Document 2: JP 2007-64333A

DISCLOSURE OF THE INVENTION

Problems to be Solved by the Invention

However, the conventional metal diaphragm valves have the following disadvantages. A metal diaphragm valve is arranged to control the flow of a fluid such as hot gas by bringing a valve element into or out of contact with a valve seat. In a valve closed state, the valve element presses against and hence closely contacts with the valve seat to shut off the flow of the fluid. In a valve open state, a flow rate of a fluid flowing in a valve chamber is determined by a stroke (a separation distance) between the valve element and the valve seat when the valve element comes out of contact with the valve seat.

When the valve element contacts with the valve seat for valve closing, the valve seat receives a pressing force from the valve element and a portion of the valve seat that is in contact with the valve element is greatly depressed or compressed. In contrast, when the valve opens from this state, a reactive force caused by the pressing force of the valve element acts on the valve seat and accordingly the depressed portion of the valve seat will attempt to return to a shape before depression (a previous shape).

In the case where the fluid is a hot gas exemplified above and the flow of this hot gas is to be controlled by the metal diaphragm valve, the valve element, the valve seat, and others in the valve chamber of the metal diaphragm valve are exposed to high temperatures. In this case, the hot gas is allowed to continuously flow from an inlet port to an outlet port through the valve chamber for a long period after valve opening from a valve closed state. Further, the valve seat attempts to gradually return to the shape before depression. The temperature of the valve chamber at that time rises above the temperature in the valve closed state where no hot gas flows. As the temperature rises, the valve seat will thermally expand.

In the metal diaphragm valve, while the fluid is flowing after valve opening, the valve seat undergoes deformation with time by a deformation amount corresponding to the sum of a return amount toward the valve element due to the reactive force and the thermally expansion amount toward the valve element due to the temperature rise in the valve chamber. Accordingly, a real stroke (separation distance) between the valve seat and the valve element varies.

Specifically, just after valve opening, the valve seat remains depressed and also cold because hot gas does not flow in the valve yet. Thus, the upper surface of the valve seat is further away from the valve element than in before depression. Thus, the stroke between the valve seat and the valve element is larger than in before depression. On the other hand, as the time advances by a predetermined time from valve opening, the valve seat returns toward a previous state before depression and also expands because the valve chamber is increased in temperature up to the temperature of flowing hot gas. Thus, the upper surface of the valve seat comes closer to the valve element than in the depressed state and therefore the stroke between the valve seat and the valve element decreases.

Consequently, the stroke between the valve seat and the valve element is different between just after valve opening and after a predetermined time elapsed from valve opening. While hot gas is flowing in the valve chamber during valve opening, the flow rate (a Cv value) of hot gas varies between just after valve opening and after a lapse of a predetermined time from valve opening.

In Patent Document 1, there is no disclosure about the material, the structure, and others of the valve seat 250 which will be deformed greatly by opening/closing of the metal diaphragm 260. However, if the valve seat 250 is made of metal, the valve seat 250 will be hardly deformed when the metal diaphragm 260 contacts with the valve seat 250 for valve closing.

However, for valve closing, the metal diaphragm 260 and the valve seat 250, both of which are made of metal, contact with each other, thereby likely damaging the valve seat 250. When the number of contact times of the valve seat 250 with the metal diaphragm 260 reaches about 50,000, the sealing performance begins to decrease, resulting in a defect in durability of the valve seat 250.

On the other hand, even if the valve seat 250 is made of resin capable of providing higher durability than the metal valve seat, no special design is applied to the shape of such valve seat 250 that is likely to be deformed greatly by opening/closing of the metal diaphragm 260 under a high temperature.

In Patent Document 2, the gap ΔS between the diaphragm holding member 365 and the valve seat 350 is set to a height corresponding to about 55% to 70% of the maximum protruding height Δh of the central portion of the metal diaphragm 360 relative to the valve seat 350, so that the Cv value falls within a range of 0.55 to 0.8.

In Patent Document 2, however, even though the valve seat 350 is made of synthetic resin, such as PFA, tending to soften earlier than metal, no special design is applied to the shape of such valve seat 350 that is likely to be deformed greatly by opening/closing of the metal diaphragm 360.

In Patent Documents 1 and 2, when hot gas is allowed to flow from the inlet port to the outlet port through the valve chamber for a long period after the valve is opened from the valve closed state, the valve seat 250 (350) undergoes large deformation with time after valve opening by an amount corresponding to the sum of the return amount toward the metal diaphragm 260 (360) due to the reactive force and the thermal expansion amount toward the diaphragm 260 (360) due to the temperature rise in the valve chamber. As a result, the real stroke between the valve seat 250 (350) and the metal diaphragm 260 (360) changes. Thus, a difference in the stroke becomes larger with time after valve opening.

As above, when a difference in the stroke between the valve seat 250 (350) and the metal diaphragm 260 (360) occurs after valve opening, the flow rate of a fluid flowing during valve opening varies. This results in a problem that a decrease in Cv value after valve opening could not be restrained within 0.2, which is recently demanded as the flow-rate control accuracy of the valve in the manufacturing industry of precision components such as semiconductors.

Further, in the conventional metal diaphragm in which the second thickness t2 is set to be as large as about 2.7 times the first thickness t1, the sealing performance between the valve element and the valve seat member 150 is higher than that of the metal valve seat. However, as in Patent Documents 1 and 2, when the valve is placed in the open state, the flow rate of a fluid allowed to flow varies and the fluid could not flow at an stable flow amount.

The present invention has been made to solve the above problems and has a purpose to provide a valve seat structure of a fluid control valve capable of ensuring sealing performance with respect to a valve element and reducing variations in flow rate while a fluid to be controlled continues to flow.

Means of Solving the Problems

To achieve the above purpose, one aspect of the invention provides a valve seat structure of a fluid control valve comprising a valve element, a body formed with an inlet port and an outlet port, and a valve seat member provided in the body, the fluid control valve being configured to bring the valve element into or out of contact with the valve seat member to control the flow of a fluid, wherein the valve seat member is formed in a ring shape and includes a valve seat portion with which the valve element will come into or out of contact, and assuming that a thickness of the valve seat portion in a radial direction of the valve seat member is a first thickness t1 ($0 < t1$), a second thickness t2 corresponding to a height of the valve seat member in a direction along an axis of the fluid control valve is determined in a range of $0.5\,t1 \leq t2 \leq 1.5\,t1$.

Effects of the Invention

According to the above aspect, the following effects can be provided. In a semiconductor manufacturing process, for instance, when the flow of hot gas, such as $H_2$ gas and Ar gas, heated to about 200° C. is to be controlled by the fluid control valve including the aforementioned valve seat structure, if the hot gas continues to flow from an inlet port to an outlet port through a valve chamber for a long period after a valve opening operation from a valve closed state, a difference in a stroke (a separation distance) between the valve seat member and the valve element between just after valve opening and after a lapse of a predetermined time from valve opening can be made smaller. This can reduce variations in flow rate of a fluid (e.g., hot gas) flowing in the valve chamber of the fluid control valve.

Accordingly, it is possible to restrain the decrease in Cv value after valve opening to 0.2 or less which is recently demanded as the flow-rate control accuracy of the valve in the manufacturing industry of precision components such as semiconductors. This can reduce variations in flow rate of the fluid flowing while the valve is in an open state. In contrast, when the valve is placed in a closed state, the valve element firmly presses against the valve seat member and comes into close contact with the valve seat member, thereby ensuring high sealing performance. The flow of a fluid such as hot gas can be shut off without leakage toward the outlet port.

In the aforementioned valve seat structure of a fluid control valve, specifically, the valve seat member is formed in the ring shape and includes the valve seat portion with which the valve element comes into or out of contact. Assuming that the thickness of the valve seat portion in the radial direction of the valve seat member is the first thickness t1 (0<t1), a second thickness t2 of the valve seat member, i.e., the height in a valve seat height direction along an axis direction of the fluid control valve is determined in a range of 0.5 t1≤t2≤1.5 t1.

In the valve seat structure of the conventional metal diaphragm in which the second thickness is set to about 2.7 times the first thickness, when the pressing force of the valve element acts on the valve seat portion of the valve seat member, a depression amount of the valve seat portion is for example 0.5 mm. In contrast, in the valve seat structure of a fluid control valve according to the aforementioned aspect of the invention, even by the same level of pressing force, a depression amount is reduced to for example as small as 0.25 mm, half the conventional depression amount. The return amount of the valve seat member toward the valve element due to the reactive force after valve opening is also reduced to about half, as with the depression amount.

As exemplified, when the hot gas continues to flow from the inlet port to the outlet port through the valve chamber for a long period after valve opening from a valve closed state, the temperature of the valve chamber increases more than that in the valve closed state where no hot gas flows in the valve. Thus, the valve seat member (the valve seat portion) tends to thermally expand. Even in comparison between the valve seat structure of the fluid control valve in the aforementioned aspect of the invention in which the second thickness is 1.5 times or less the first thickness and the valve seat structure of the conventional metal diaphragm valve in which the second thickness is about 2.7 times the first thickness, the thermal expansion amount of the valve seat member of the valve seat structure of the fluid control valve in the aforementioned aspect is smaller than that of the valve seat structure of the conventional metal diaphragm valve by the second thickness being smaller than the valve seat height of the valve seat member.

In the valve seat structure of the fluid control valve in the aforementioned aspect of the invention, accordingly, the deformation amount of the valve seat member corresponding to the sum of the return amount due to the reactive force and the thermal expansion amount associated with the temperature rise in the valve chamber after valve opening can be made smaller than that in the valve seat structure of the conventional metal diaphragm valve.

When the flow of hot gas (fluid) is to be controlled by the above fluid control valve, the real stroke between the valve seat member and the valve element while the hot gas continues to flow from the inlet port to the outlet port through the valve chamber for a long period after the valve opening operation from the valve closed state has little stroke difference between just after valve opening and after a lapse of a predetermined time from valve opening.

As a result, while hot gas continues to flow in the valve chamber during valve opening, it is possible to reduce variations in flow rate of hot gas. In the conventional structure, the Cv value after valve opening is decreased by as much as 0.4.

In contrast, in the valve seat structure of the fluid control valve in the aforementioned aspect of the invention, a decrease in Cv value after value opening can be restrained within 0.2 which is recently demanded in the manufacturing industry of precision components such as semiconductors.

Here, the Cv value will be explained below. The Cv value is the dimensionless number defined as a number representing that, in a valve open state where a valve element of a fluid control valve is opened at a predetermined degree, "the flow rate of fresh water, at 60° F. (about 15.5° C.), that will flow through the valve while keeping a differential pressure (a pressure drop) of 1 psi (6.895 kPa) between an inlet port side and an outlet port side, in terms of US gal/min (1 USgal=3.785 L) (gpm)".

The Cv value is determined by actual measurement using a known measuring device such as a fluid flow meter and a fluid pressure meter. The Cv value is assumed to be 1 when the valve opening degree of the valve element is full and the fresh water at about 15.5° C. flows with a differential pressure of 6.895 kPa and a flow rate of 3.785 L. The Cv value is calculated by the following expression:

$$Cv = Q \cdot (G/\Delta P)^{(1/2)}$$

where Q (gpm) is a flow rate of a fluid, G is a specific gravity, ΔP (psi) is a differential pressure of a fluid.

As the Cv value is larger, the fluid control valve has a wider flow channel through which a fluid passes. The valve seat structure of the fluid control valve in the aforementioned aspect is directed for example to a fluid control valve configured such that, when the fluid to be controlled is mainly gas and the valve element is placed in a full open state, a full stroke (a maximum separation distance) between a valve seat member and a valve element is about 1 mm.

Specifically, the valve seat structure of the fluid control valve in the aforementioned aspect is directed for example to a fluid control valve configured such that the stroke between the valve seat member and the valve element is 0.9 mm and the Cv value is 0.7 in a valve full open state just after valve opening. In the manufacturing industry of precision components such as semiconductors, fluid control valves like the aforementioned one are often used. Accordingly, a demand to restrain a decrease (a difference) in Cv value after valve opening to 0.2 or less arose from the manufacturing industry of precision components in order to meet the marketing needs for high precision and high quality of products. For this demand, which is assumed as an indication or target to ensure the quality of precision components (products), the valve seat structure of the aforementioned aspect of the invention is configured to prevent the Cv value from decreasing, after a predetermined time elapsed from valve opening, to less than 0.5 corresponding to a 30% reduction of 0.7 which is a Cv value just after valve opening.

On the other hand, the valve seat member is formed with the second thickness larger by 0.5 times or more than the first thickness. Thus, the valve seat member can have sufficient deformation allowance allowing the valve element to press against the valve seat member more deeply when the valve is placed in a closed state. Accordingly, the valve seat member can come into close contact with the valve element to ensure high sealing performance. This can shut off the flow of a fluid such as hot gas without leakage toward the outlet port.

Consequently, the valve seat structure of the fluid control valve in the aforementioned aspect of the invention can provide the effects that sealing performance with respect to the valve element can be ensured and variations in flow rate of a fluid to be controlled can be reduced while the fluid is flowing.

MODE FOR CARRYING OUT THE INVENTION

A detailed description of a preferred embodiment of the present invention will now be given referring to the accompanying drawings.

A fluid control valve in this embodiment is for example a gas control valve 1 for controlling the flow of hot gas (fluid), such as H2 gas and Ar gas, heated to about 200° C. to supply or shut off the gas with respect to a semiconductor manufacturing device and others in a semiconductor manufacturing process, a liquid crystal panel manufacturing process, and other processes. In this embodiment, a valve seat structure of such a gas control valve 1 is explained.

Figure 1:
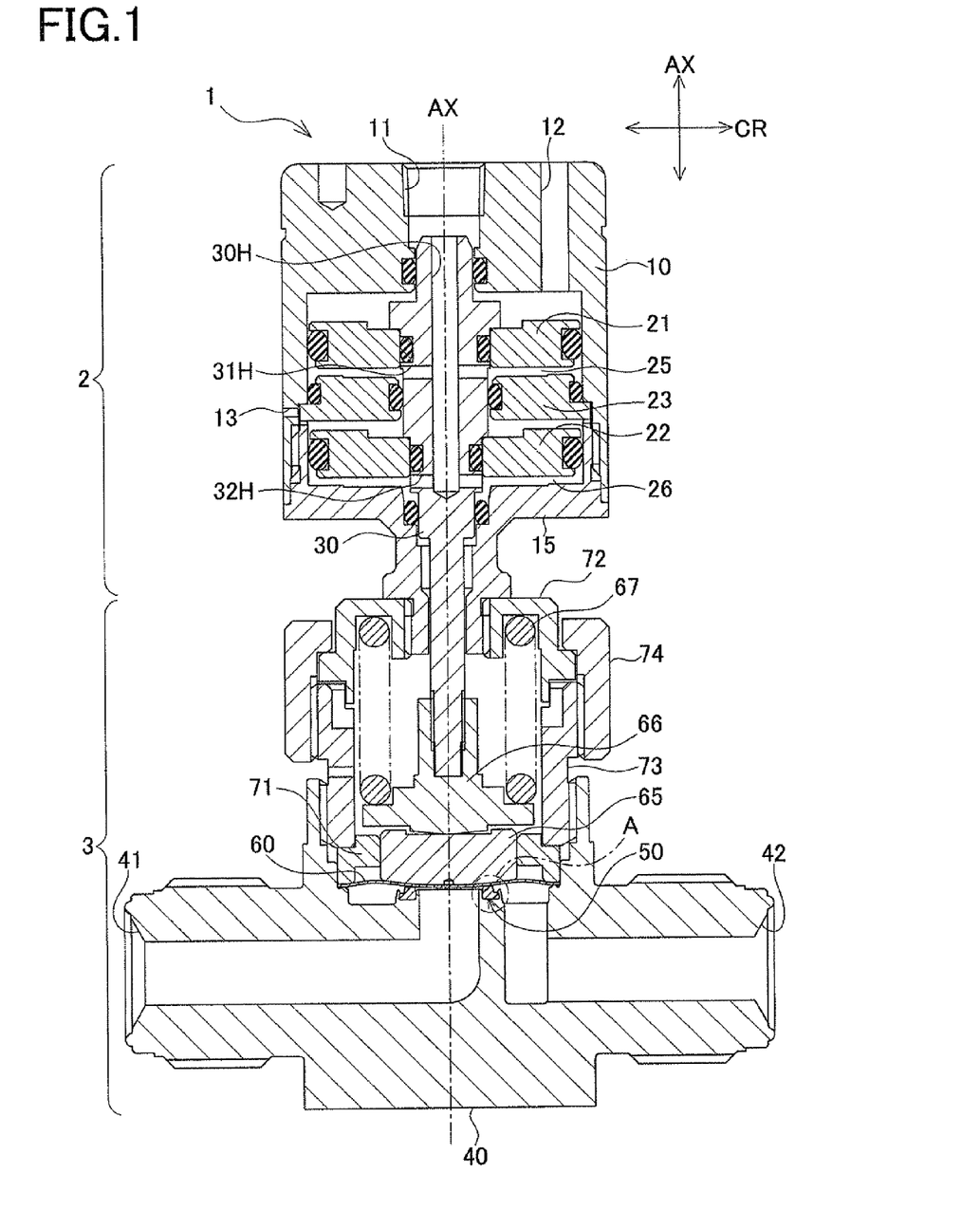
FIG. 1 is an explanatory view showing a gas control valve in an embodiment.
Figure 2:
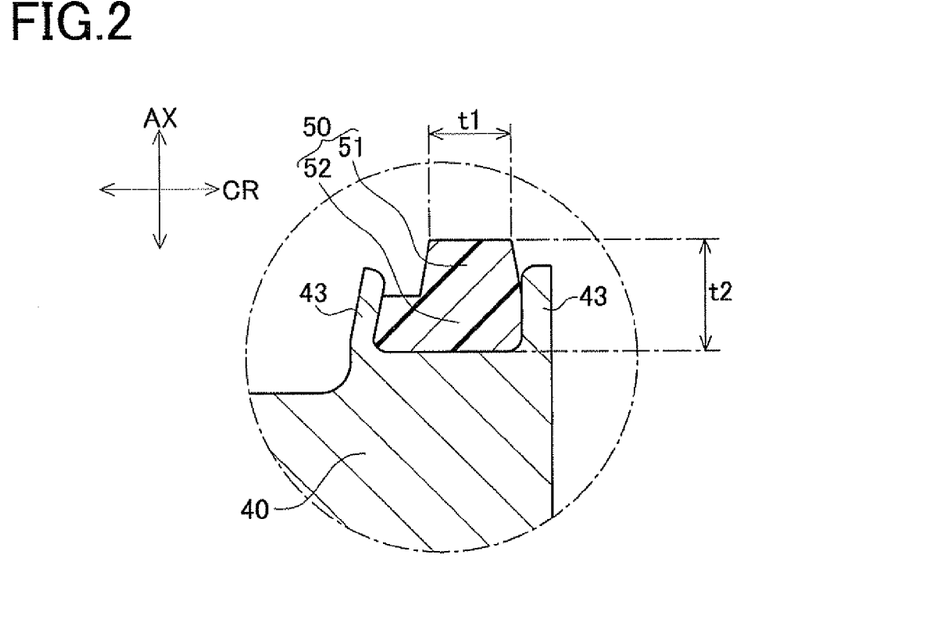
FIG. 2 is an enlarged view of a part A in FIG. 1 to explain a valve seat structure of a gas control valve in Example 1.

FIG. 1 is an explanatory view showing a gas control valve in Example 1 of the present embodiment, showing a valve closed state. FIG. 2 is an enlarged view of a part A in FIG. 1 to explain the valve seat structure of the gas control valve in Example 1.

The gas control valve 1 (the fluid control valve) includes a diaphragm valve element 60 (a valve element), a body 40 formed with an inlet port 41 and an outlet port 42, and a valve seat member 50 provided in the body 40. The gas control valve 1 is configured to bring the valve element 60 into or out of contact with the valve seat member 50 to control the flow of hot gas.

The gas control valve 1 roughly consists of an air control section 2 and a valve control section 3 as shown in FIG. 1.

The air control section 2 will be first explained. This air control section 2 in the present embodiment includes two cylinders, i.e., a first cylinder 10 and a second cylinder 15, two pistons, i.e., a first piston 21 and a second piston 22, a partition member 23, and others. All of these components are made of metal such as stainless steel. The first cylinder 10 is formed with a first breathing hole 12 and a second breathing hole 13. The first cylinder 10 and the second cylinder 15 are joined by screw connection into one piece. The partition member 23 is held between the first cylinder 10 and the second cylinder 15 to divide the internal space of those first and second cylinders 10 and 15 into a first pressure chamber 25 and a second pressure chamber 26. The first cylinder 10 is formed with the first breathing hole 12 for the first piston 21 and the second breathing hole 13 for the second piston 22.

The first piston 21 is placed between the first cylinder 10 and the partition member 23. The second piston 21 is placed between the second cylinder 15 and the partition member 23. In the internal space of the first and second cylinders 10 and 15, an upper portion of a piston rod 30 extending in a direction of the axis AX (an "axis direction AX") is disposed. This upper portion of the piston rod 30 is formed with a pilot hole 30H extending in the axis direction AX. Two through holes, i.e., a first through hole 31H and a second through hole 32H are formed to extend in a radial direction CR perpendicular to the pilot hole 31H and in communication with the pilot hole 31H. A lower portion of the piston rod 30 is disposed in the valve control section 3 mentioned below.

The valve control section 3 includes the body 40, the valve seat member 50, the diaphragm valve element 60, a valve element holding member 65, a stem 66, a spring 67, a guide member 71, a spring support member 72, a connecting member 73, a fixing member 74, and others. All of these components are made of metal such as stainless steel.

The body 40 has the inlet port 41 and the outlet port 42 as shown in FIGS. 1 and 2. Between these inlet port 41 and outlet port 42, the valve seat member 50 which is a separate part from the body 40 is provided. Further, the body 40 is formed with a pair of annular grasping portions 43 defining a groove therebetween in which the valve seat member 50 is fitted. The grasping portions 43 extend circumferentially about the axis AX and are arranged inside and outside in the radial direction CR.

The valve seat member 50 is formed in a ring shape and includes a valve seat portion 51 with which the diaphragm valve element 60 will come into and out of contact, and a fixed portion 52 located under the valve seat portion 51. The valve seat member 50 is made of fluorocarbon resin, which is, in the present embodiment, PFA (tetrafluoroethylene-perfluoroalkyl vinyl ether copolymer).

The valve seat member 50 is fixed to the body 40 as shown in FIG. 2 in such a way that the fixed portion 52 is placed between the grasping portions 43 and one of the grasping portion 43 located inside in the radial direction CR and the other grasping portion 43 located outside in the radial direction CR are deformed or crimped toward each other, thereby holding or pinching the valve seat member 50 in the radial direction CR.

To be concrete, the fixed portion 52 is designed to be wider than a first thickness t1 of the valve seat member 50 (the valve seat portion 51) and is fixedly pinched in the radial direction CR of the valve seat member 50 by the grasping portions 43 which are a part of the body 40.

The valve seat member 50 is designed so that, assuming that the thickness of the valve seat portion 51 in the radial direction CR is the first thickness $t1$ ($0<t1$), the second thickness $t2$ corresponding to the height of the valve seat member 50 in the axis direction AX of the gas control valve 1 is determined in a range of $0.5\ t1 \leq t2 \leq 1.5\ t1$. The relationship between the first thickness $t1$ and the second thickness $t2$ will be described in detail later.

The diaphragm valve element 60 is, for example, a metal diaphragm valve element made of metal, such as Ni alloy and Co alloy, subjected to a treatment for preventing heat distortion and others in a hot gas atmosphere at about 200° C. This valve element 60 is formed in a reversed dish-like shape protruding upward and capable of returning upward in the axis direction AX to its original shape by its own elastic force (elasticity). The valve element 60 is placed integral with the valve element holding member 65 held by the guide member 71 in such a way that a central portion of the valve element 60 in the radial direction CR contacts with a curved lower surface of the valve element holding member 65.

Further, a peripheral edge portion of this diaphragm valve element 60 in the radial direction CR is sandwiched and fixed between the body 40 and the guide member 71. The guide member 71 is fixed to the body 40 by screw connection between the body 40 and the connecting member 73. Screw connection between the connecting member 73 and the fixing member 74 makes the spring support member 72 integral with the connecting member 73.

A stem 66 is connected to a lower end portion of the piston rod 30. The stem 66 will come into contact with an upper surface of the valve element holding member 65. The metal spring 67 is placed between the stem 66 and the spring support member 72 to urge the stem 66 downward.

Herein, the concept of the Cv value is explained. The Cv value is the dimensionless number defined as a number expressing that, in a valve open state where a valve element of a fluid control valve is opened at a predetermined degree, "the flow rate of fresh water, at 60° F. (about 15.5° C.), that will flow through the valve while keeping a differential pressure (a pressure drop) of 1 psi (6.895 kPa) between an inlet port side and an outlet port side, in terms of US gal/min (1 USgal=3.785 L) (gpm)".

This Cv value is determined by actual measurement using a known measuring device such as a fluid flow meter and a fluid pressure meter. The Cv value is assumed to be 1 when the valve opening degree of the valve element is full and the fresh water at about 15.5° C. flows with a differential pressure of 6.895 kPa and a flow rate of 3.785 L. The Cv value is calculated by the following expression:

$$Cv = Q \cdot (G/\Delta P)^{(1/2)}$$

where Q (gpm) is a flow rate of a fluid, G is a specific gravity, ΔP(psi) is a differential pressure of a fluid.

As the Cv value is larger, the fluid control valve has a wider flow channel through which a fluid passes. The valve seat structure of the gas control valve 1 in the present embodiment is directed for example to a fluid control valve configured such that, when the fluid to be controlled is mainly gas (e.g., $H_2$ gas or Ar gas) and the diaphragm valve element 60 is placed in a full open state, a full stroke (a maximum separation distance) between the valve seat member 50 and the valve element 60 is about 1 mm.

Specifically, in the gas control valve 1 in the present embodiment, the stroke (the separation distance) St between the diaphragm valve element 60 in the full open state and the valve seat portion 51 of the valve seat member 50 is set to 0.9 mm in an atmosphere of 200° C. and just after valve opening. The Cv value at that time is 0.7.

Operations of the gas control valve 1 will be explained below. While no pilot air is supplied to the operation port 11, the stem 66 is urged to contact with the valve element holding member 65 by the spring 67, thereby pressing the central portion of the valve element 60 in the radial direction CR through the holding member 65. Accordingly, as shown in FIG. 1, the valve element 60 is placed in contact with the valve seat portion 51 of the valve seat member 50, thus shutting off the flow of hot gas from the inlet port 41 to the outlet port 42.

While the gas control valve 1 is in a closed state, the first through hole 31H communicates with the first pressure chamber 25 and the second through hole 32H communicates with the second pressure chamber 26.

On the other hand, when pilot air is supplied to the operation port 11, the pilot air flows in the first through hole 31H and the second through hole 32H via the pilot hole 30H to pressurize the first pressure chamber 25 and the second pressure chamber 26 at the same time. Accordingly, the first piston 21 and the second piston 22 are moved upward by the pressurized pilot air against the urging force of the spring 67. At that time, the air present on the upper side of the first piston 21 and on the upper side of the second piston 22 in the first and second cylinders 10 and 15 are respectively discharged through the first breathing hole 12 and the second breathing hole 13. As the first and second pistons 21 and 22 are moved upward, the stem 66 separates together the piston rod 30 from the valve element holding member 65. The central portion of the valve element 60 in the radial direction CR then returns upward by its own elastic force. Accordingly, the valve element 60 comes out of contact with the valve seat portion 51 of the valve seat member 50 for valve opening, thereby allowing hot gas to flow from the inlet port 41 to the outlet port 42.

When the diaphragm valve element 60 is to be closed from the open state, the pressurized pilot air is discharged from the first pressure chamber 25 and the second pressure chamber 26 through the operation port 11.

Figure 3:
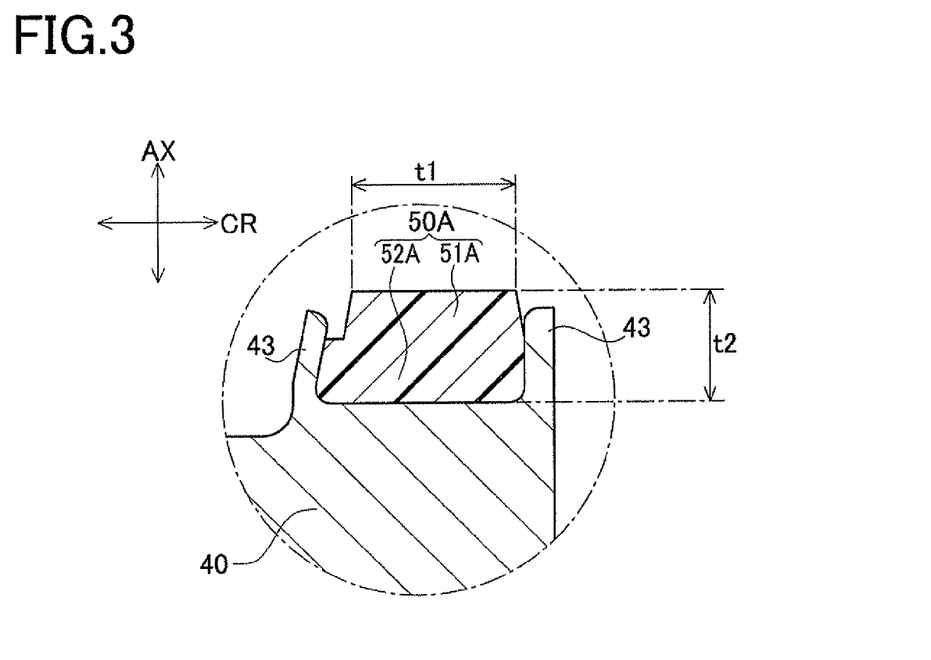
FIG. 3 is an enlarged view corresponding to the part A in FIG. 1 to explain a valve seat structure of a gas control valve seat portion in Example 2.

Concrete shapes of the valve seat member 50 will be described below in Examples 1 and 2 by showing the relationship between the first thickness t1 and the second thickness t2 with reference to FIGS. 2 and 3. FIG. 3 is an enlarged view corresponding to a part A in FIG. 1 to explain a valve seat structure of a gas control valve in Example 2.

Example 1

Example 1 shows a configuration that the second thickness t2 is 1.25 t1 as with the shape of the valve seat member 50 shown in FIG. 2. Concretely, in this configuration, for example, the thickness of the valve seat portion 51 (the first thickness) is t1=1.2 mm and the height of the valve seat member 50 (the second thickness) is t2=1.5 mm.

In Example 1, the gas control valve 1 is opened from a valve closed state. Hot gas is continuously supplied to flow from the inlet port 41 to the outlet port 42 through the valve chamber for a long period. After a lapse of a predetermined time from a valve opening time, the stroke St between the valve element 60 in a full open state and the valve seat portion 51 of the valve seat member 50 and the Cv value at that time are measured.

Figure 5:
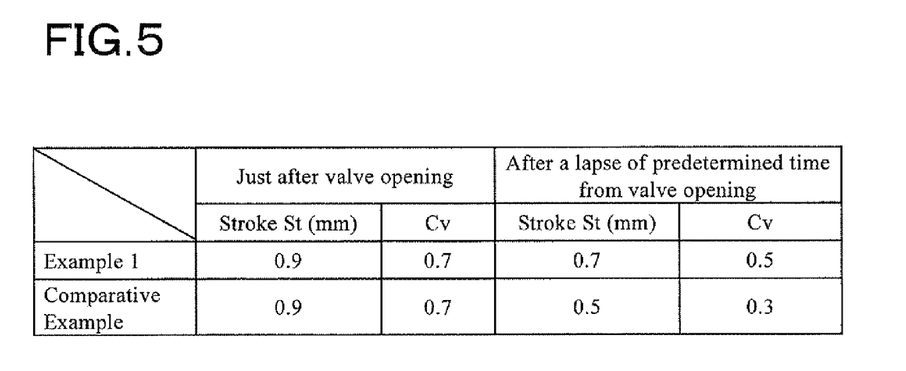
FIG. 5 is a table showing a relationship between the time after valve opening and the flow rate of flowing hot gas by comparing Example 1 and Comparative example.

FIG. 5 is a table showing a relationship between the time elapsed from valve opening and the flow rate of flowing hot gas by comparing the valve seat structure of the gas control valve in Example 1 and a valve seat structure of a conventional gas control valve as Comparative example.

In Example 1, the stroke St just after valve opening in an atmosphere of 200° C. is 0.9 mm and the stroke St after a predetermined time elapsed from the valve opening time is 0.7 mm as shown in FIG. 5. When the Stroke St just after valve opening is 0.9 mm, the Cv value is 0.7. When the stroke after the predetermined time elapsed from the valve opening is 0.7 mm, the Cv value is 0.5. Specifically, between just after valve opening and after a predetermined time elapsed from valve opening, a stroke difference ΔSt is 0.2 mm. The Cv value is decreased by a difference of up to 0.2.

On the other hand, in Comparative example, the stroke St just after valve opening is 0.9 mm, whereas the stroke St after a predetermined time elapsed from valve opening is 0.5 mm. The Cv value for the stroke St just after valve opening being 0.9 mm is 0.7, whereas the Cv value for the stroke St after a predetermined time elapsed from valve opening being 0.5 mm decreases down to 0.3. In other words, between the time just after valve opening and the time after a predetermined time elapsed from valve opening, a stroke difference ΔSt is 0.4 mm. The Cv value is decreased by a difference of as much as 0.4.

Results of Example 1 and Comparative example are studied below.

The gas control valve 1 is a valve for controlling the flow of a fluid such as hot gas by bringing the diaphragm valve element 60 into or out of contact with the valve seat member 50. In the valve closed state, the valve element 60 presses against the valve seat portion 51 of the valve seat member 50 and hence closely contacts with the valve seat portion 51, thereby shutting off the flow of hot gas or the like. In the valve open state, the flow rate of hot gas or the like flowing in the valve chamber is determined by the stroke St between the valve seat member 50 and the valve element 60 separated from the valve seat member 50.

When the valve element 60 contacts with the valve seat portion 51 of the valve seat member 50 for valve closing, the valve seat portion 51 receives the pressing force from the valve element 60 and thus a portion of the valve seat portion 51 contacting with the valve element 60 is greatly depressed or sinks. When the valve is opened from this state, on the other hand, the reactive force resulting from the pressing force of the valve element 60 acts on the valve seat member 50. The depressed portion of the valve seat member 50 then attempts to return to its previous shape, i.e., a shape before depression.

In the case where the fluid is the hot gas exemplified above and the flow of this hot gas is to be controlled by the gas control valve 1, the valve element 60 and the valve seat member 50 located in the valve chamber of the gas control valve 1 are exposed to a temperature of about 200° C. In this case, when the hot gas is allowed to continuously flow from the inlet port 41 to the outlet port 42 through the valve chamber for a long period after the valve is opened from the closed state, the depressed valve seat portion 51 of the valve seat member 50 attempts to gradually return to its shape before depression after valve opening. Furthermore, since the temperature of the valve chamber at that time rises above the temperature in the valve closed state where no hot gas flows, the valve seat member 50 also will thermally expand due to the temperature rise.

In the gas control valve 1, while hot gas is flowing after valve opening, the valve seat portion 51 (the valve seat member 50) is deformed with time after valve opening by an amount corresponding to the sum of the return amount of the valve seat portion 51 toward the valve element 60 by the reactive force and the thermal expansion amount of the valve seat portion 51 toward the valve element 60 due to the temperature rise in the valve chamber. This changes the real stroke St between the valve seat portion 51 of the valve seat member 50 and the valve element 60.

Specifically, the valve seat portion 51 remains depressed at the instant following the valve opening and also the valve seat portion 51 remains cold at a temperature before hot gas flows. Accordingly, the upper surface of the valve seat portion 51 is in a position further away from the valve element 60 than in the shape before depression. Thus, the stroke St between the valve seat portion 51 and the valve element 60 is larger than in the shape before depression.

After the predetermined time elapsed from valve opening, on the other hand, the valve seat portion 51 elastically returns toward its previous shape and also expands because the valve chamber increases in temperature up to the temperature of the flowing hot gas. Thus, the upper surface of the valve seat portion 51 is in a position closer to the valve element 60 than in the depressed shape and the stroke St between the valve seat portion 51 and the valve element 60 is smaller than in the depressed shape. Consequently, between just after valve opening and after a predetermined time elapsed from valve opening, the stroke St between the valve seat portion 51 and the valve element 60 changes. While hot gas is flowing through the valve chamber during valve opening, therefore, the flow rate (the Cv value) of hot gas varies between just after valve opening and after a predetermined time elapsed from valve opening.

In the present embodiment, as described above, the valve seat member 50 is formed in a ring shape and includes the valve seat portion 51 which will come into or out of contact with the diaphragm valve element 60. Assuming that the thickness of the valve seat portion 51 in the radial direction CR of the valve seat member 50 is the first thickness t1 (0<t1), the second thickness t2 which is the thickness of the valve seat member 50 in the valve seat height direction along the axis direction AX of the gas control valve 1 is set to 1.25 times the first thickness t1, i.e., t2=1.25 t1 falling within a range of 0.5 t1≤t2≤1.5 t1.

In the valve seat structure of the conventional metal diaphragm valve (Comparative example) formed with the second thickness about 2.7 times larger than the first thickness, when the pressing force of the diaphragm valve element 60 acts on the valve seat portion 51 of the valve seat member 50, for example, the depression amount of the valve seat portion is 0.5 mm and the return amount of the valve seat portion is 0.3 mm.

In contrast, in the valve seat structure of the gas control valve 1 of the present embodiment, the depression amount of the valve seat portion 51 is about 0.25 mm, which is smaller by about half the conventional depression amount even through the pressing force is the same magnitude as in the conventional valve seat structure. Further, as well as the depression amount, the return amount of the valve seat portion 51 of the valve seat member 50 toward the diaphragm valve element 60 by the reactive force after valve opening is 0.15 mm which is smaller by about half the conventional return amount.

When hot gas continues to flow from the inlet port 41 to the outlet port 42 through the valve chamber for a long period after the valve is opened from the valve closed state, the temperature of the valve chamber increases above the temperature in the valve closed state where no hot gas flows, thereby causing thermal expansion of the valve seat member 50 (the valve seat portion 51). In comparison between the valve seat structure of the gas control valve 1 of the present embodiment in which the second thickness t2 is set to be 1.5 times or less the first thickness t1 and the valve seat structure of the conventional metal diaphragm valve in which the second thickness t2 is set to be about 2.7 times the first thickness t1, the valve seat structure of the gas control valve 1 of the present embodiment can achieve a smaller thermal expansion amount (e.g., 0.05 mm) of the valve seat member 50 (the valve seat portion 51) because of the second thickness t2 smaller than the valve seat height of the valve seat member 50 as compared with the thermal expansion amount (e.g., 0.1 mm) in the valve seat structure of the conventional metal diaphragm valve.

In the valve seat structure of the gas control valve 1 of the present embodiment, accordingly, the deformation amount of the valve seat member 50 after valve opening corresponding to the sum of the return amount due to the reactive force and the thermal expansion amount due to the temperature rise in the valve chamber can be restrained to be smaller than in the valve seat structure of the conventional metal diaphragm valve.

Specifically, when the flow of the exemplified hot gas (fluid) is to be controlled by the gas control valve 1, the real stroke St between the valve seat member 50 and the valve element 60 while the hot gas continues to flow from the inlet port 41 to the outlet port 42 through the valve chamber for a long period after the valve opening operation from the valve closed state provides a smaller stroke difference between just after valve opening and after the predetermined time elapsed from valve opening than in the conventional valve seat structure. As a result, while the hot gas is continuously flowing through the valve chamber during valve opening, it is possible to reduce variations in the flow rate of hot gas. Although the Cv value after valve opening in the conventional configuration is decreased by as much as 0.4, the valve seat structure of the gas control valve 1 in the present embodiment can restrain a decrease (difference) in Cv value to 0.2 or less which is recently demanded in the manufacturing industry of precision components such as semiconductors.

In the manufacturing industry of precision components such as semiconductors, fluid control valves like the gas control valve 1 are often used. A demand to restrain a decrease (difference) in Cv value after valve opening to 0.2 or less arose from the manufacturing industry of precision components in order to meet the marketing needs for high precision and high quality of products. This demand is assumed as an indication or target to ensure the quality of precision components (products) after a predetermined time elapsed from valve opening by preventing the Cv value from decreasing to less than 0.5 corresponding to a 30% reduction of 0.7 which is a Cv value just after valve opening.

On the other hand, the valve seat member 50 in the valve seat structure of the gas control valve 1 of the present embodiment is formed with the second thickness 0.5 times or more larger than the first thickness. Thus, the valve seat member 50 can have sufficient deformation allowance allowing the valve element 60 to press against the valve seat member 50 more deeply when the valve is placed in a closed state. It is therefore possible to make the valve seat member 50 come into close contact with the valve element 60 to ensure high sealing performance. This can shut off the flow of a fluid such as hot gas without leakage toward the outlet port 42.

Example 2

A valve seat member 50A in Example 2 is configured as shown in FIG. 3, as with Example 1, such that a fixed portion 52A is placed between the grasping portions 43. One grasping portion 43 located inside in the radial direction CR and the other grasping portion 43 located outside in the radial direction CR are deformed or crimped toward each other, thereby pinching the valve seat member 50A in the radial direction CR to fix the valve seat member 50A in the body 40.

In Example 2, the valve seat member 50A in FIG. 3 is designed to have a second thickness t2=0.63 t1. To be concrete, for example, a thickness t1 of a valve seat portion 51A is 2.2 mm and the height (the second thickness) t2 of the valve seat member 50A is 1.5 mm. In this case, the depression amount of the valve seat portion 51A is 0.13 mm and the return amount of the valve seat portion 51A is 0.10 mm.

Figure 4:
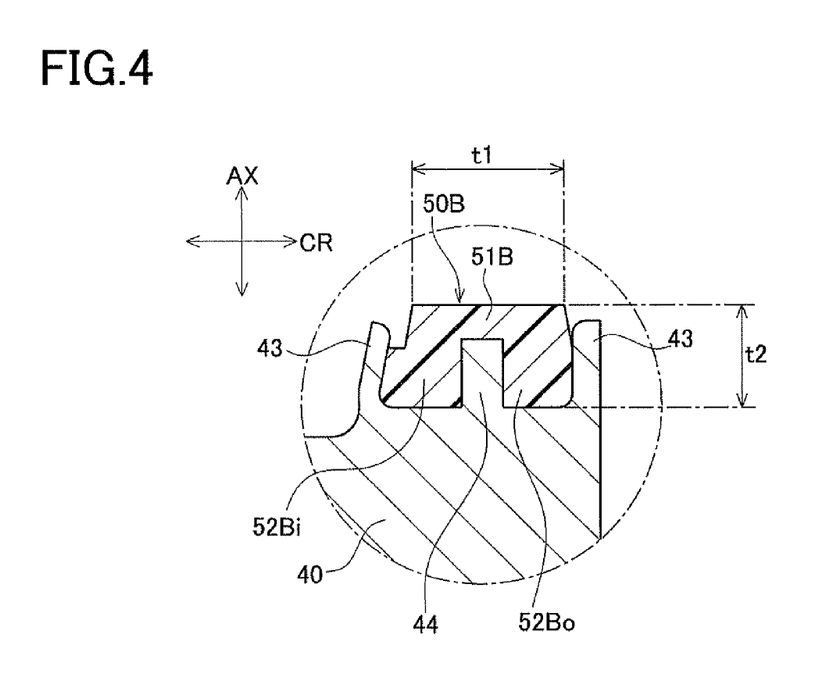
FIG. 4 is an enlarged view corresponding to the part A in FIG. 1 to explain a valve seat structure of a gas control valve in a modified example.

A modified example of Example 2 is shown in FIG. 4 which is an explanatory view of a valve seat structure of a gas control valve in the modified example of Example 2. In this example, as shown in FIG. 4, a valve seat member 50B is fixed to the body 40 in such a way that fixed portions 52Bi and 52Bo are placed between the grasping portions 43 and one grasping portion 43 located inside in the radial direction CR and the other grasping portion 43 located outside in the radial direction CR are deformed or crimped toward each other, thereby pinching the valve seat member 50B in the radial direction CR.

To be concrete, the body 40 is provided with an intermediate protrusion 44 between the grasping portions 43 in the radial direction CR to extend circumferentially and protrude upward in FIG. 4. On both sides of the intermediate protrusion 44, the fixed portion 52Bi is located inside in the radial direction CR and the fixed portion 52Bo is located outside in the radial direction CR. The valve seat member 50B is positioned in place by the fixed portions 52Bi and 52Bo and the intermediate protrusion 44 and thus can be fixed by being firmly pressed by the grasping portions 43 and the intermediate protrusion 44.

Example 2 and the modified example are brought under the same review as Example 1 mentioned above. The details thereof are not repeated here.

Operations and effects of the valve seat structure of the gas control valve 1 in the present embodiment configured as above will be explained.

In the present embodiment, the valve seat structure of the gas control valve 1 includes the diaphragm valve element 60, the body 40 formed with the inlet port 41 and the outlet port 42, and the valve seat member 50 provided in the body 40 and is configured to bring the valve element 60 into or out of contact with the valve seat member 50 to control the flow of hot gas. The valve seat member 50 is formed in a ring shape and includes the valve seat portion 51 with which the valve element 60 will come into or out of contact. Assuming that the thickness of the valve seat portion 51 in the radial direction CR of the valve seat member 50 is the first thickness t1 (0<t1), the second thickness t2 defined as the height of the valve seat member 50 in the direction of the axis AX of the gas control valve 1 is determined in a range of 0.5 t1≤t2≤1.5 t1. Accordingly, in a semiconductor manufacturing process, for example, when the flow of hot gas, such as $H_2$ gas and Ar gas, heated to about 200° C. is to be controlled by the gas control valve 1 provided with the valve seat structure in the present embodiment, while the hot gas continues to flow from the inlet port 41 to the outlet port 42 through the valve chamber for a long period after valve opening from the valve closed state, the stroke St between the valve seat portion 51 of the valve seat member 50 and the valve element 60 can be achieved with a reduced stroke difference between just after valve opening and after the predetermined time elapsed from the valve opening time. Accordingly, it is possible to reduce variations in flow rate of hot gas (fluid) flowing through the valve chamber of the gas control valve 1.

Consequently, the decrease (difference) in Cv value after valve opening can be restrained to 0.2 or less which is recently demanded as the flow rate control accuracy of the valve in the manufacturing industry of precision components such as semiconductors. This can reduce variations in flow rate of the fluid flowing in the valve in an open state. When the valve is closed, on the other hand, the diaphragm valve element 60 firmly presses against the valve seat portion 51 of the valve seat member 50 and thus closely contacts with the valve seat portion 51 of the valve seat member 50, ensuring high sealing performance. It is therefore possible to shut off the flow of a fluid such as hot gas without leakage toward the outlet port 42.

The gas control valve 1 in the present embodiment can consequently ensure the sealing performance with the diaphragm valve element 60 and reduce variations in the flow rate while hot gas to be controlled continues to flow.

In the gas control valve 1 in the present embodiment, the valve seat member 50 is made of fluorocarbon resin such as PFA (tetrafluoroethylene-perfluoroalkyl vinyl ether copolymer). Accordingly, for example, the diaphragm valve element 60 made of metal or the like can have appropriate hardness to moderately press against the valve seat portion 51 of the valve seat member 50. Thus, the valve element 60 is able to easily come into close contact with the valve seat portion 51. Even when a corrosive fluid is to be controlled, the valve seat member 50 will not corrode by this fluid.

The fluorocarbon resin may include, as well as PFA (tetrafluoroethylene-perfluoroalkyl vinyl ether copolymer), PI (polyimide), PVDF (polyvinyliden fluoride) (difluoride), PCTFE (polychloro-trifluoroethylene) (trifluoride), PTFE (polytetrafluoroethylene) (tetrafluoride).

In the gas control valve 1 in the present embodiment, furthermore, the valve seat member 50 is a separate part from the body 40 and fixed to the body 40 with the grasping portions 43 by deforming or crimping. Thus, the valve seat member 50 can be attached to the body 40 by a simple work.

In the gas control valve 1 in the present embodiment, the valve seat member 50 includes the fixed portion 52 under the valve seat portion 51. The fixed portion 52 is designed with a thickness wider than the first thickness t1. The fixed portion 52 of the valve seat member 50 is pinched and fixed in the radial direction CR of the valve seat member 50 by the grasping portions 43 which are a part of the body 40. The valve seat member 50 is thus fixed in a stable state. While the valve is closed, even if the diaphragm valve element 60 does not vertically contact with the valve seat portion 51 of the valve seat member 50 along the axis direction AX of the gas control valve 1 due to abnormal operations of the valve element 60 and the valve element 60 contacts with the valve seat portion 51 at a slant with respect to the axis AX, the valve seat member 50 is less likely to become displaced in the radial direction CR.

The above embodiment is a mere example and does not give any limitations to the present invention. The present invention may be embodied in other specific forms without departing from the essential characteristics thereof.

(1) For instance, in the above embodiment, the air control section 2 is provided with two cylinders, i.e., the first cylinder 10 and the second cylinder 15, and two pistons, i.e., the first piston 21 and the second piston 22, to generate a pressure against the urging force of the spring 67. However, the number of cylinders and the number of pistons installed in the air control section 2 may be changed appropriately.

(2) In the above embodiment, the gas control valve 1 is a normal close type which is opened when supplied with pilot air through the operation port 11. Alternatively, the invention may be applied to a fluid control valve of a normal open type which is closed when supplied with pilot air through the operation port.

DESCRIPTION OF THE REFERENCE SIGNS

1 Gas control valve (Fluid control valve)
40 Body
41 Inlet port
42 Outlet port
50 Valve seat member
51 Valve seat portion
52 Fixed portion
60 Diaphragm valve element
AX Axis (Axis direction)
CR Radial direction

The invention claimed is:

1. A valve seat structure of a fluid control valve comprising:
a valve element, a body formed with an inlet port and an outlet port, and a valve seat member provided in the body, the fluid control valve being configured to bring the valve element into or out of contact with the valve seat member to control the flow of a hot fluid,
wherein the valve seat member is made of fluorocarbon resin and formed in a ring shape and includes a valve seat portion with which the valve element will come into or out of contact,
a thickness of the valve seat portion in a radial direction of the valve seat member is a first thickness t1 (0<t1), a second thickness t2 corresponding to a height of the valve seat member in a direction along an axis of the fluid control valve is determined in a range of $0.5 \le t1 \le 1.5 t1$,
after the valve element comes into contact with the valve seat member, a return amount of the valve seat height of the valve seat member is 0.15 mm or less,
after the valve element comes out of contact with the valve seat member and the hot fluid continues to flow after a predetermined time, a thermal expansion amount of the valve seat height of the valve seat member toward the valve element is 0.05 mm or less,
the valve seat member with the return amount of 0.15 mm or less and the thermal expansion amount of 0.05 mm or less is configured such that, while the hot fluid continues to flow, a change in Cv value is 0.2 or less, wherein: $Cv=Q \cdot (G/\Delta P)^{(1/2)}$, where Q (gpm) is a flow rate of a fluid, G is a specific gravity, $\Delta P$(psi) is a differential pressure of a fluid, and
just after valve opening, a change in Cv value is 0.2 or less.

2. The valve seat structure of the fluid control valve according to claim 1, wherein the valve seat member is a separate part from the body and is fixed to the body by crimping.

3. The valve seat structure of the fluid control valve according to claim 2, wherein
the valve seat member further includes a fixed portion located under the valve seat portion,
the fixed portion is formed with a thickness wider than the first thickness t1, and
the valve seat member is fixed to the body in such a way that the fixed portion is pinched in the radial direction of the valve seat member by a part of the body.

4. The valve seat structure of the fluid control valve according to claim 2, wherein
the valve seat member further includes a fixed portion located under the valve seat portion,
the fixed portion is formed with a thickness wider than the first thickness t1, and the valve seat member is fixed to the body in such a way that the fixed portion is pinched in the radial direction of the valve seat member by a part of the body.

* * * * *